Feb. 3, 1970
T. T. MAY
3,492,747
MERCHANDISE INVENTORY CONTROL SYSTEM
Filed June 26, 1967
2 Sheets-Sheet 1
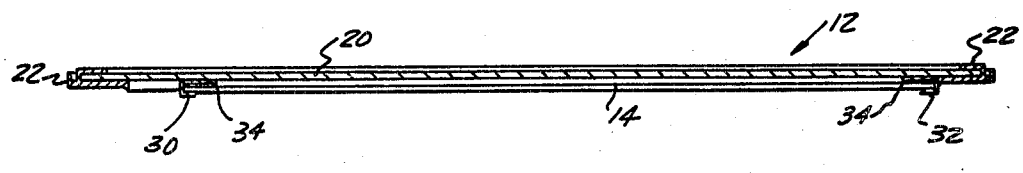
INVENTOR
TIMOTHY T. MAY
BY
ATTORNEYS Feb. 3, 1970    T. T. MAY    3,492,747

MERCHANDISE INVENTORY CONTROL SYSTEM

Filed June 26, 1967    2 Sheets-Sheet 2

INVENTOR
TIMOTHY T. MAY

BY *Hauke, Krass, & Gifford*
ATTORNEYS

3,492,747
MERCHANDISE INVENTORY CONTROL SYSTEM
Timothy T. May, 60 Willison Road,
Grosse Pointe Shores, Mich. 48236
Filed June 26, 1967, Ser. No. 648,822
Int. Cl. G09f 1/10
U.S. Cl. 40—124.2     9 Claims

ABSTRACT OF THE DISCLOSURE

An inventory control board having movable bars for visually displaying data-bearing cards and arranging the cards to indicate the length of time the item associated with each card has been in stock.

BACKGROUND OF THE INVENTION

Field of the invention

This invention relates to inventory control systems and more specifically to a display board for visually indicating items of merchandise maintained in a running inventory with cooperating elements arranged to indicate the length of time any particular item has been in stock.

Description of the prior art

A significant factor in the successful operation of an automobile retail outlet is the ability to maintain a proper mix between car models and, in the case of a used vehicle outlet, a proper mix between the vehicles of the different manufacturers. It is important that the on-hand inventory reflect current consumer demands. For instance, assuming actual consumer demand results in the purchase of two station wagons out of every ten vehicles sold, it is desirable that the on-hand inventory approximately bear this same relationship. If a proper mix between the various models is not maintained on a current basis, those models which are in over supply tend to accumulate and over a period of time lose their value.

In summary, the problem is one of controlling the mix between the various models and quickly ascertaining those models which are not selling.

The broad purpose of the present invention is to provide a control system which visually indicates both the current model mix and those models which have remained in inventory for an extended period of time and which in addition can be employed by small as well as large volume dealers as an inventory control.

SUMMARY

The preferred embodiment of the present invention is described with reference to a system for maintaining an inventory control over a stock of used automotive vehicles, however, it is to be understood that the system can be readily employed with other types of merchandise.

The preferred system which will be subsequently described in greater detail, comprises a visual display device consisting of three major elements: a control board, a set of thirty-one movable bars, and stock cards which are preferably color coded to identify different model vehicles.

The control board has a vertical column of figures forming a "time in stock" table and numbered 1–3 to indicate the number of days an item has been in stock.

Each of the movable thirty-one bars has a number corresponding to a particular date in a month consisting of thirty-one days. The bars each consist of an extrusion having a novel form of cross-section adapted to releasably display a series of data-bearing cards. The bars are horizontally mounted within a pair of vertical, spaced channels attached to the control board with the bars being stacked one above the other. The set of bars form a movable "date" table with each number on a bar being arranged adjacent a number of the "time in stock" table. The bars are arranged in a descending numerical sequence with the top bar representing the current date and being opposite the figure "1" on the control board, the second bar representing the previous day and being adjacent the figure "2" of the control board, the third bar representing the second day before the current date and, therefore, being opposite the figure "3" of the control board, etc.

The data cards each identify a particular vehicle and are preferably color coded to identify different models. The cards associated with the vehicles introduced into the inventory or any specific date are mounted on the bar bearing that date. As each vehicle is removed from the inventory, the card associated with that vehicle is removed from the control board.

Thus the dealer can readily determine how many days in stock the vehicles associated with a particular date have been in stock. For instance the top bar which is the current date and is therefore opposite the "1" indicates that the vehicles that have been introduced into the inventory on the current date are in their first day in stock. The color coded cards readily reflect the mix of the vehicles introduced on the current date. Similarly, the vehicles introduced into inventory ten days ago are on the bar opposite the figure "10" of the control board. The bottom bar which is opposite the figure "31" indicates those vehicles that have been on hand for 31 days. Each day the cards are removed from the bottom bar and inserted on a pair of fixed bars at the bottom of the control board which are associated with "over-age" vehicles. The 31 day period is an arbitrary period adopted as a means for determining at what point a decision must be made with regards to disposing of these "over-age" vehicles such as reducing their price, etc. The bottom bar is then removed from the board each of the remaining bars indexed downwardly one position, and the separated bar inserted in the top position. The data cards associated with the new vehicles being introduced into the lot are inserted on the new top bar.

Thus, the control system essentially consists of a series of horizontal data-bearing bars which are rotated through a cycle once each 31 days by indexing each bar each day to a new position relative to the "time in stock" table to reflect the day-by-day aging of the vehicles.

The dealer can observe at a glance how many station wagons, hard tops, four-door, two-door or miscellaneous models are currently in inventory and which of these models is selling at a faster or slower rate than the remaining models. The dealer can then tailor his inventory to reflect the current consumer market.

It is therefore an object of the present invention to provide an inventory control board having means for visually indicating the quantity of each of several categories of merchandise which are on hand with means for reflecting the period of time each item in each category has been in stock.

It is another object of the present invention to provide an inventory control device comprising a board having a "time in stock" table indicating the accumulative number of days an item has been in stock; a plurality of data-bearing bars, each having an individual date marked thereon, and means for mounting the bars in a vertical sequence for movement in directions parallel to the "time in stock" table so that the bars can be indexed relative to the table on a daily basis to reflect the increasing age of merchandise associated with data cards carried by each bar.

It is still another object of the present invention to provide an extruded section for visually displaying information on a card comprising an extrusion having a pair of spaced, longitudinally running slots formed on a common side of the extrusion and separated by a mid-section with lip sections being formed on the outer sidewall of each slot and directed toward the mid-section so that a data-bearing card can be mounted on the extrusion by disposing the mid-portion of the card against the mid-section of the extrusion and inserting the upper and lower edges within the slots and behind the lips.

Still further objects and advantages of the present invention will readily occur to one skilled in the art to which the invention pertains on reference to the following detailed description.

DESCRIPTION OF THE DRAWINGS

The description refers to the accompanying drawings in which like reference characters refer to like parts throughout the several views and in which:

FIGURE 1 is an elevational view of an inventory control board illustrating the preferred embodiment of the invention with the mid-portion of the board removed for purposes of clarity;

FIGURE 2 is a sectional view of the inventory control illustrated in FIGURE 1 as seen along lines 2—2 of FIGURE 1;

DESCRIPTION OF THE PREFERRED EMBODIMENT

Figure 3:
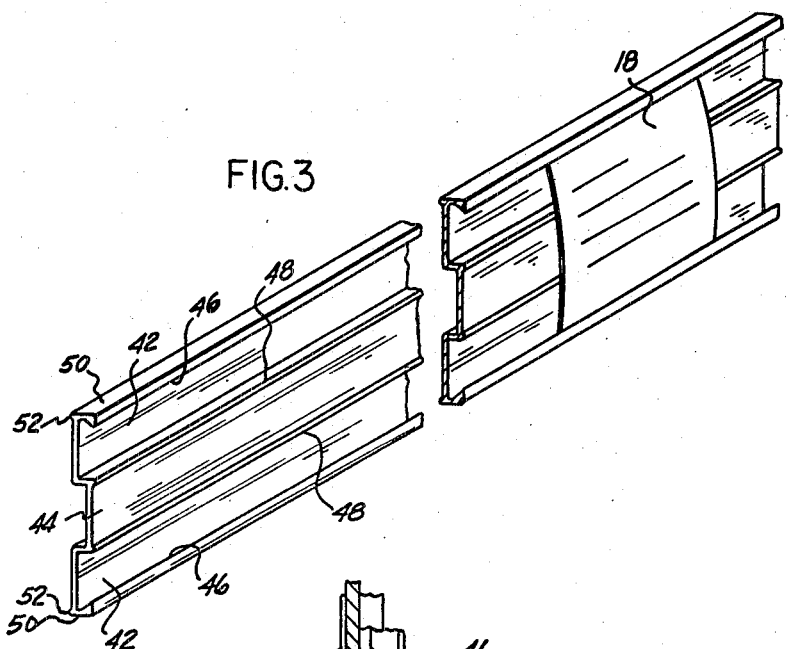
FIGURE 3 is a perspective view of one of the data-bearing extruded bars mounted on the device of FIGURE 1.

Referring to the drawings, FIGURE 1 illustrates an inventory control device 10 employed as a means for controlling a stock of used vehicles, However, it is to be understood that the device 10 can be employed as an inventory control tool for any of a wide variety of merchandise which may be classified into a number of categories and wherein it is necessary to visually indicate the mix between the various categories as well as the inventory age of the items in each category.

The device 10 comprises a control board 12, a plurality of sliding bars 14 removably mounted on the board 12, a pair of fixed bars 16 fixedly mounted on the board 12 and a plurality of data-bearing cards 18 which are mounted on the bars 14 and 16 and have data associated with particular vehicles.

The control board 12 preferably comprises a flat rectangular section 20 of Masonite or the like, framed by a pair of side members 22 which are connected at their upper and lower ends by cross members 24. The frame members 22 and 24 are preferably formed of extruded sections out of a ilght weight material such as anodized aluminum to provide a rugged but atractive construction.

A "time in stock" table of numbers 26 is formed preferably along the left margin of the control board 12, the table 26 preferably containing the numbers 1 through 31 in ascending sequence in a vertical column. Each number of the table 26 reflects the number of days that a vehicle associated with the particular number has been in stock. Below the table 26 is a label 28 marked "over-age" and associated with the fixed bars 16 for a purpose which will be subsequently described.

A pair of channel members 30 and 32 having a generally J-shaped cross-section are opposedly and fixedly mounted to the board 10 in spaced parallel relationship with the channel member 30 being arranged adjacent the table 26. The channel members 30 and 32 are preferably formed from an aluminum extrusion with their wide side being attached to the board 20. A ridge 34 is formed along the extreme edge of the wide side of each of the channel members and provides a bearing surface for the sliding bars 14. The channels 30 and 32 are open at their upper end to permit a bar 14 to be slidably inserted into position.

A notch 36 is formed in the outer sidewall of the left channel 30 slightly above the upper edge of the upper fixed bar 16. The notch 36 has a height slightly greater than the height of the movable bars 14 and provides the means for removing the bottom movable bar 14 from between the channels 30 and 32. The lower edge of the notch 36 extends sufficiently above the fixed bars 16 to provide means for retaining the bottom bar 14. It will also be noted that the notch is adjacent figure "31" which is the bottom figure of the table 26.

Figure 4:
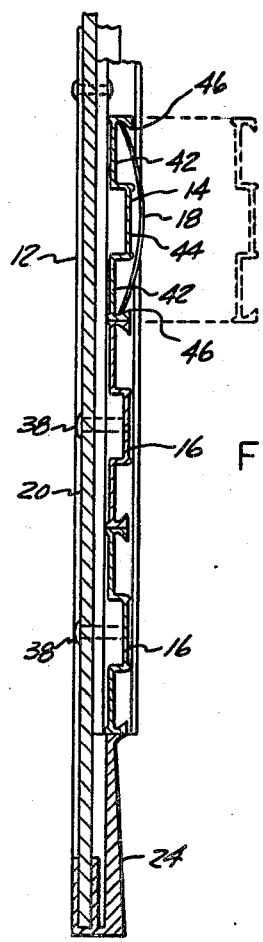
FIGURE 4 is a sectional enlarged view taken along lines 4—4 of FIGURE 1.

FIGURE 4 illustrates how the movable bars 14 and the fixed bars 16 have a similar cross-sections. However, the fixed bars 16 are attached to the board 20 preferably by rivets 38.

Now referring to FIGURE 3 for a detailed description of the cross-section of the extruded bars 14 and 16, a typical bar is illustrated at 40 as comprising an extruded section having a pair of spaced parallel longitudinally running slots 42 interconnected by a mid-section 44. The slots 42 open to a common side of the extrusion 40 and are similar to one another. A lip 46 is formed along the open edge of the outer sidewall of each of the slots 42. The lips 46 are directed toward the mid-section 44. Ridges 48 formed along the side edges of the mid-section 44 and which form an outward extension of the inner sidewall of the slots 42 are coplanar with one another and with the outer surface of the lips 46. It will be noted that the upper and lower sides 50 of the extrusion 40 are flat and arranged in spaced parallel relationship with one another so that they abut in surface to surface relationship with similarly shaped bars when the bars are mounted on the board 12. The length of the typical bar 40 is such that it extends between the channels 30 and 32 and is slidably mounted therein. Longitudinal ridges 52 formed on the back of the extrusion 40 and adjacent the sides provide a bearing surface which is slodably engaged with the vertical ridges 34 on mounting channels 30 and 32 so that the bars freely slide within the channels without binding. In addition the ridges 52 provide the bars with longitudinal strength while at the same time providing a cross-section which can be extruded by using a minimum amount of material.

As best seen in FIGURE 4, the cards 18 are mounted on the bars by disposing the mid-portion of each card adjacent the mid-section 44 of the bar and inserting the upper and lower edges of the card into the slots 42 and behind the lips 46. The novel cross-section of the preferred data card bearing bars provides a means for readily inserting on or separating the cards 18 from the control board.

The data cards 18 are preferably color coded to accommodate the various model vehicles such as two-door, four-door, station wagons and the like, so that the user can readily tell at a glance the mix of his stock.

The cards 18 are mounted on the uppermost bar 14 when the vehicle with which the cards are associated are introduced into the inventory. The cards 18 remain with their particular bar until one of two conditions occur. If the vehicle associated with the card is removed from the inventory, the card 18 is separated from its associated bar. If, on the other hand, the vehicle remains in the inventory for a period of 31 days, the card is removed from its associated bar 14 and inserted in one of the fixed bars 16 to indicate that it has passed into the "over-age" class. In this case, the vehicle will normally receive some type of special consideration such as a price adjustment, or the like.

Each bar 14 has an indicia 54 associated with a particular date of a month of 31 days. Thus, there are 31 bars 14. The bars 14 are mounted on the board 12 with the indicia 54 arranged in descending sequence. The indicia corresponding to the current date is in the uppermost position opposite the figure "1" of the table 26. The cards of the vehicles introduced into stock on the current date are mounted on the uppermost bar. The dealer can readily ascertain from the color code the mix of the vehicles and by noting which number of the table 26 that the bar carrying the card in which he is interested is aligned be can tell how long the vehicle has been in inventory. Thus, assuming the current date is the 31st day of the month, the fifth bar down from the top which bears the number 27 and carries the cards 18 prepared for the vehicles introduced into the inventory on the 27th day of the month is aligned with figure "5" of the table 26 to indicate to the dealer that these vehicles are in their fifth day in stock. Similarly the bottom most bar which bears the number "1" indicates that the vehicles introduced into stock on the first day of the month are in their 31st day.

Each day the cards 18 on the bottom bar 14 are separated from the bar and mounted on the fixed bars 16. The bottom bar 14 is then separated from the board 12 by raising all the bars 14 up a sufficient distance to permit the bottom bar 14 to be removed through the notch 36. The remaining bars then slide down one position to reflect that the vehicles on each bar have accumulated another day in stock. The removed bar is then installed in the vacant uppermost position opposite the number "1" of the table 26. The cards associated with vehicles introduced on the current date are then mounted on this uppermost bar. This procedure is performed once each day in a matter of seconds to index all of the bars to their new positions.

Since some months have less than 31 days, there are two alternative methods of aging the vehicles associated with these months. For instance, February has 28 days. When the bar 14 bearing the number "1" reaches the 28th day in stock, all of the cards 18 can be removed from the bars 14 numbered "1," "31," "30" and "29" and put in the "overage" group, thereby allowing the bars to be indexed so that the bar 14 having figure number "1" will be at the top position opposite the figure "1" of the table 26 so that the month of March can be correctly initiated.

The alternative method in the case of February is to remove the cards 18 from the bars "1," "31" and "30" and put these cards on the preceding bars such as bar 28 to insure that they are classified as still being saleable stock. The cards from bar 14 bearing the number "29" are put in the "over-age" classification. The four bars are then moved to the top of the board to start out the month of March correctly with the bar 14 bearing he number "1" being at the top of the board and the other bars bearing the numbers "31," "30" and "29" being mounted directly below the top bar.

Although, I have described my invention in terms of a control device for determining the age of merchandise on a daily basis for a period of a month, it is to be understood that the chronological periods and the number of bars can be chosen to suit the particular type of merchandise.

Having described my invention, I claim:

1. A device useful as a merchandise inventory control system, comprising:
 (a) a body structure having a time table containing a sequence of indicia representing an accumulative measure of time;
 (b) a plurality of data bearing elements each having a characteristic indicia identifying a specific interval in a chronological period and being arranged in a sequence; and
 (c) means for mounting said data bearing elements to said body structure to form a cyclical, movable date table with each indicia of said date table being visibly aligned with an indicia of said time table so that the chronological age of the date associated with any specific data bearing element can be readily determined.

2. The system as defined in claim 1, wherein the indicia of said time table provides accumulative measure of the number of days in a chronological period and the indicia of said date table correspond to the days in a month.

3. The system as defined in claim 2, wherein the indicia of said time table are arranged in a column in ascending order and said data bearing elements are mounted so that the indicia of said date table are in a column adjacent to said time table with element at the head of the date table bearing the indicia corresponding to the current date.

4. The system as defined in claim 3, wherein said date table is indexed by removing the bottom element from the body structure advancing each of the remaining elements downward to the position occupied by its succeeding element and mounting said bottom element in the position previously occupied by the head element of the date table.

5. The system as defined in claim 1, wherein said time table has 31 indicia arranged in a column in ascending sequence.

6. The system as defined in claim 5, wherein, each of said data bearing elements is progressively indexed from an initial position adjacent the first of said 31 indicia toward a position adjacent the last said 31 indicia and then returned to said initial position to complete a cycle.

7. The system as defined in claim 1, wherein said body structure comprises a board, said time table being formed on said time table being formed on said board in a vertical column in an ascending sequence from an uppermost indicia to a bottom indicia; a pair of channels oppositely mounted on said board in spaced parallel relationship to one another and to said time table; said data bearing elements comprising elongated bars adapted to retain data bearing cards with their ends slidably received by said spaced channels for movement in directions parallel to said time table.

8. The system as defined in claim 7, wherein said elongated bars are arranged in a coplanar stacked relationship with the upper and lower edges of adjacent bars abutting one another, and including means supporting the lowermost of said elongated bars when said board is in an upright position.

9. The system as defined in claim 8, wherein each of said bars comprises an extrusion having a pair of spaced, longitudinally running slots connected by a mid-section, a longitudinal lip formed on the outer sidewall of each of said slots, said lips being directed toward said mid-section so that a data bearing card can be retained by said bar by disposing the mid-portion of the card against said mid-section and inserting the upper and lower edges of the card into the slots and behind said lips.

References Cited

UNITED STATES PATENTS

| | | | |
|---|---|---|---|
| 1,972,959 | 9/1934 | Taylor | 40—16 |
| 2,192,679 | 3/1940 | Kimball | 40—19.5 |
| 2,787,068 | 4/1957 | Anspach | 40—64 |
| 3,254,432 | 6/1966 | Wassell | 40—16 |
| 3,368,295 | 2/1968 | Burns | 40—124 |

EUGENE R. CAPOZIO, Primary Examiner

WENCESLAO J. CONTRERAS, Assistant Examiner

U.S. Cl. X.R.

40—19.5